(12) United States Patent
Mitsunaka et al.

(10) Patent No.: US 8,605,222 B2
(45) Date of Patent: Dec. 10, 2013

(54) RECEIVER DEVICE, TUNER, AND TELEVISION RECEIVER

(75) Inventors: Takeshi Mitsunaka, Osaka (JP); Pascal Lore, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1038 days.

(21) Appl. No.: 12/457,871

(22) Filed: Jun. 24, 2009

(65) Prior Publication Data
US 2009/0322950 A1 Dec. 31, 2009

(30) Foreign Application Priority Data

Jun. 30, 2008 (JP) .................................. 2008-171221

(51) Int. Cl.
| | |
|---|---|
| H04N 5/44 | (2011.01) |
| H04N 3/27 | (2006.01) |
| H04N 5/46 | (2006.01) |
| H04N 5/14 | (2006.01) |
| H04N 5/268 | (2006.01) |
| H04N 5/30 | (2006.01) |
| H04M 1/12 | (2006.01) |

(52) U.S. Cl.
USPC ........... 348/705; 348/553; 348/554; 348/555; 348/571; 348/572; 348/706; 348/725; 348/731

(58) Field of Classification Search
USPC ......... 348/553, 554, 555, 571, 572, 725, 731, 348/705, 706
See application file for complete search history.

(56) References Cited

U.S. PATENT DOCUMENTS

| | | | | |
|---|---|---|---|---|
| 6,178,211 | B1 * | 1/2001 | Whikehart et al. | ........... 375/350 |
| 6,640,093 | B1 * | 10/2003 | Wildhagen | .................... 455/130 |
| 7,265,792 | B2 * | 9/2007 | Favrat et al. | ................... 348/554 |
| 2003/0215028 | A1 * | 11/2003 | Hammes et al. | .............. 375/316 |
| 2004/0218576 | A1 | 11/2004 | Imagawa et al. | |
| 2005/0202842 | A1 | 9/2005 | Brobston et al. | |
| 2005/0259186 | A1 * | 11/2005 | Mehr et al. | .................... 348/731 |
| 2006/0083335 | A1 * | 4/2006 | Seendripu et al. | ............ 375/332 |
| 2006/0121937 | A1 | 6/2006 | Son | |
| 2007/0243832 | A1 | 10/2007 | Park et al. | |

FOREIGN PATENT DOCUMENTS

| | | |
|---|---|---|
| JP | 02-134911 | 5/1990 |
| JP | 2001-44868 | 2/2001 |
| JP | 2003-46401 | 2/2003 |
| JP | 2007-243504 | 9/2007 |
| JP | 2007-529181 | 10/2007 |

* cited by examiner

*Primary Examiner* — Nasser Goodarzi
*Assistant Examiner* — Kyu Chae
(74) *Attorney, Agent, or Firm* — Harness, Dickey & Pierce, P.L.C.

(57) ABSTRACT

A receiver device is provided singly capable of applying demodulator circuits with differing frequency characteristics with respective signals of desired frequencies for the demodulator circuits. The receiver device in accordance with the present invention switches between a mode in which a digital signal having a frequency suitable for various signal processes is supplied to a DA converter and a mode in which a digital signal for which the IF frequency is about 30 MHz to 60 MHz is supplied to the DA converter, by using a switch and a wire.

12 Claims, 5 Drawing Sheets

RECEIVER DEVICE, TUNER, AND TELEVISION RECEIVER

This nonprovisional application claims priority under 35 U.S.C. §119(a) on Patent Application No. 2008-171221 filed in Japan on Jun. 30, 2008, the entire contents of which are hereby incorporated by reference.

TECHNICAL FIELD

The present invention relates in general to receiver devices, tuners, and television receivers which are built around semiconductor devices and in particular to receiver devices, tuners, and television receivers incorporating a combination of an analog circuit which processes analog signals and a digital circuit which processes digital signals provided on a semiconductor substrate.

BACKGROUND ART

Cable or radio wave-based receiver devices (the television tuner is a typical example) convert the frequency of signals received, for example, via an antenna to IF (Intermediate Frequency) frequency (intermediate frequency, center frequency) suitable to the broadcasting system in a particular country or region, to supply signals with desirable frequencies to either a demodulator circuit for analog television broadcast or a demodulator circuit for digital television broadcast. The desirable frequencies are generally about 30 MHz to 60 MHz although the IF frequencies vary depending on the country or region in which the receiver device is being used.

There is conventional technology, as disclosed in, for example, U.S. Patent Application 2006/0083335 (published Apr. 20, 2006; hereinafter "patent literature 1"), that builds up the receiver device from semiconductor devices, in other words, from a combination of analog and digital circuits provided on a semiconductor substrate.

FIG. 5 is a schematic block diagram of a conventional receiver device. FIG. 5 shows the configuration of the receiver device disclosed in patent literature 1 as an exemplary configuration of the conventional receiver device.

The receiver device shown in FIG. 5 includes an input terminal 401, a variable gain low noise amplifier (typically called VGLNA) 402, frequency converters 403 and 404, filters 405 and 406 composed of analog circuitry ("analog filters"), AD converters (analog-to-digital converters) 407 and 408, filters 409 and 410 composed of digital circuitry ("digital filters"), frequency converters 411 and 412, an adder 413, and a DA converter (digital-to-analog converter) 414.

An analog filter 415, a variable gain low noise amplifier 416, and an output terminal 417 are connected in series in this order following the receiver device shown in FIG. 5, that is, to an output terminal (not shown) of the DA converter 414.

In the receiver device shown in FIG. 5, parts of the AD converters 407 and 408 (those parts which process digital signals), the digital filters 409 and 410, the frequency converters 411 and 412, the adder 413, and a part of the DA converter 414 (that part which processes digital signals) constitute the digital circuit section 400 which processes digital signals.

The receiver device shown in FIG. 5 operates as in the following to implement various signal processes on incoming signals in a simple and convenient manner.

For example, as an analog signal (reception signal) received by an antenna (not shown) is fed at the input terminal 401 to the low noise amplifier 402, the low noise amplifier 402 amplifies the reception signal for output to the frequency converters 403 and 404.

The frequency converter 403 converts the frequency of the signal fed from the low noise amplifier 402 to a frequency suitable for the various signal processes for output to the analog filter 405. Likewise, the frequency converter 404 converts the frequency of the signal fed from the low noise amplifier 402 to a frequency suitable for the various signal processes for output to the analog filter 406.

The "frequency suitable for the various signal processes" refers to, for example, either a baseband frequency or a Low-IF (Low-intermediate frequency) frequency. The baseband frequency is the frequency of the signal obtained by such direct frequency conversion (baseband signal) that the IF frequency can be 0 Hz. The Low-IF frequency is the frequency of the signal obtained by such Low-IF frequency conversion that the IF frequency can be about 2 MHz to 4 MHz.

The frequency converters 403 and 404 are, for example, known multipliers which carries out frequency conversion of an input signal by mixing the signal with a local oscillation component generated by a local oscillator circuit (not shown).

The analog filter 405 removes unnecessary frequency components (interference) from the signal supplied from the frequency converter 403 for output to the AD converter 407. Similarly, the analog filter 406 removes unnecessary frequency components (interference) from the signal supplied from the frequency converter 404 for output to the AD converter 408.

The AD converter 407 converts the signal supplied from the analog filter 405 from analog to digital for output to the digital filter 409. Similarly, the AD converter 408 converts the signal supplied from the analog filter 406 from analog to digital for output to the digital filter 410.

The digital filter 409 removes unnecessary frequency components (interference) from the digital signal supplied from the AD converter 407 for output to the frequency converter 411. Likewise, the digital filter 410 removes unnecessary frequency components (interference) from the digital signal supplied from the AD converter 408 for output to the frequency converter 412.

The frequency converter 411 converts the digital signal supplied from the digital filter 409 from the IF frequency to the desirable frequency (about 30 MHz to 60 MHz) mentioned above for output to the adder 413. Likewise, the frequency converter 412 converts the digital signal supplied from the digital filter 410 from the IF frequency to the desirable frequency for output to the adder 413.

The adder 413 adds up the digital input signals from the frequency converters 411 and 412 for output to the DA converter 414.

The DA converter 414 converts the signal supplied from the adder 413 from digital to analog for output to the analog filter 415.

The analog filter 415 removes unnecessary frequency components (interference) from the analog signal supplied from the DA converter 414 for output to the low noise amplifier 416. The low noise amplifier 416 amplifies the analog signal supplied from the analog filter 415 for external output via the output terminal 417.

In the receiver device shown in FIG. 5, the frequency converters 403 and 404 and the frequency converters 411 and 412 convert the frequency of the reception signal to implement various signal processes on the reception signal in a simple and convenient manner. The receiver device shown in FIG. 5 then supplies the signal obtained by the frequency conversion in the frequency converters 411 and 412 to a demodulator circuit.

CITATION LIST

Patent Literature 1: U.S. Patent Application 2006/0083335 (published Apr. 20, 2006)
Patent Literature 2: U.S. Pat. No. 7,265,792 (published Jan. 5, 2006)

SUMMARY OF INVENTION

Technical Problem

A lot of research activities have been undertaken on demodulator circuits to keep pace with increasing use of digital television broadcast. Recently developed demodulator circuits are capable of processing two types of signals, both with the Low-IF frequency (or the baseband frequency), which have practically the same frequency and different phases. In other words, demodulator circuits have been developed that process, for example, IQ signals composed of an I signal indicating an in-phase component of a reception signal and a Q signal indicating an orthogonal component of the reception signal.

The traditional demodulator circuit has typical frequency characteristics from about 30 MHz to 60 MHz. In recent years, however, demodulator circuits with various frequency characteristics have been developed to match broadcasting in many countries and regions.

Under these circumstances, a single receiver device is required to be capable of supplying signals of desired frequencies for a plurality of demodulator circuits that have differing frequency characteristics.

Specifically, the receiver device needs to be configured so as to output a signal with an IF frequency of about 30 MHz to 60 MHz and selectively either a baseband frequency signal or a Low-IF frequency signal. In this configuration, a single receiver device is capable of supplying a demodulator device whose frequency characteristics are about 30 MHz to 60 MHz and a demodulator device whose frequency characteristics are the baseband frequency or the Low-IF frequency with respective signals of desired frequencies for the demodulator circuits. This feature is advantageous in providing television tuners suitable for broadcasting in each country and region.

The receiver device disclosed in patent literature 1 and shown in FIG. 5 is configured to output a signal obtained by such frequency conversion in the frequency converters 411 and 412 that the IF frequency is about 30 MHz to 60 MHz, regardless of the frequency characteristics of the demodulator circuit. That implies that the receiver device disclosed in patent literature 1 can output neither the baseband frequency signal nor the Low-IF frequency signal.

Therefore, the receiver device disclosed in patent literature 1, if operating alone, is disadvantageously not capable of supplying demodulator circuits with differing frequency characteristics with respective signals of desired frequencies for the demodulator circuits.

Solution to Problem

The present invention, conceived in view of these problems, has an objective of providing a receiver device which is singly capable of supplying demodulator circuits with differing frequency characteristics with respective signals of desired frequencies for the demodulator circuits and also of providing an associated tuner and television receiver.

A receiver device in accordance with the present invention is, to address the problems, characterized in that the device comprises: a first frequency converter for frequency-converting an analog input signal to a first frequency; an analog-to-digital converter for converting an analog signal obtained by the frequency conversion to the first frequency to a first digital signal which is a digital signal having the first frequency to output the first digital signal; a second frequency converter for frequency-converting the incoming first digital-signal to a second frequency differing from the first frequency to output a digital signal obtained by the frequency conversion as a second digital signal; a digital-to-analog converter for converting the digital input signal to an analog signal for external output; and a switching circuit for switching between a first mode in which the first digital signal is supplied to the digital-to-analog converter and a second mode in which the second digital signal is supplied to the digital-to-analog converter.

According to the configuration, the switching circuit switches between the first mode in which the first digital signal having the first frequency is supplied to the digital-to-analog converter and the second mode in which the second digital signal having the second frequency is supplied to the digital-to-analog converter. The first frequency differs from the second frequency. Accordingly, in the first mode, the digital-to-analog converter converts the first digital signal to an analog signal for external output. Meanwhile, in the second mode, the converter converts the second digital signal to an analog signal for external output. Put differently, the external output signal of the digital-to-analog converter is an analog signal having the first frequency in the first mode and an analog signal having the second frequency in the second mode.

The receiver device in accordance with the present invention is capable of singly selectively outputting either the analog signal having the first frequency and the analog signal having the second frequency. Therefore, the receiver device in accordance with the present invention is capable of singly supplying demodulator circuits having differing frequency characteristics with respective signals of desired frequencies for the demodulator circuits.

A tuner in accordance with the present invention is characterized in that the tuner includes: a receiver device in accordance with the present invention; and a demodulator circuit for demodulating an analog output signal from the digital-to-analog converter in the receiver device. A television receiver in accordance with the present invention is characterized in that the receiver includes a tuner in accordance with the present invention.

According to the configuration, the resultant tuner and television receiver are such that the receiver device is singly capable of supplying the demodulator circuits with differing frequency characteristics with respective signals of desired frequencies for the demodulator circuits.

For a fuller understanding of the nature and advantages of the invention, reference should be made to the ensuing detailed description taken in conjunction with the accompanying drawings.

Advantageous Effects of Invention

The receiver device in accordance with the present invention, as detailed above, includes: a first frequency converter for frequency-converting an analog input signal to a first frequency; an analog-to-digital converter for converting an analog signal obtained by the frequency conversion to the first frequency to a first digital signal which is a digital signal having the first frequency to output the first digital signal; a second frequency converter for frequency-converting the incoming first digital signal to a second frequency differing from the first frequency to output a digital signal obtained by the frequency conversion as a second digital signal; a digital-to-analog converter for converting the digital input signal to an analog signal for external output; and a switching circuit for switching between a first mode in which the first digital signal is supplied to the digital-to-analog converter and a second mode in which the second digital signal is supplied to the digital-to-analog converter.

These features result in the advantage that the receiver device is therefore singly capable of supplying demodulator circuits with differing frequency characteristics with respective signals of desired frequencies for the demodulator circuits.

DESCRIPTION OF EMBODIMENTS

The best mode for carrying out the invention will be described in reference to FIGS. 1 to 4.

Figure 1:
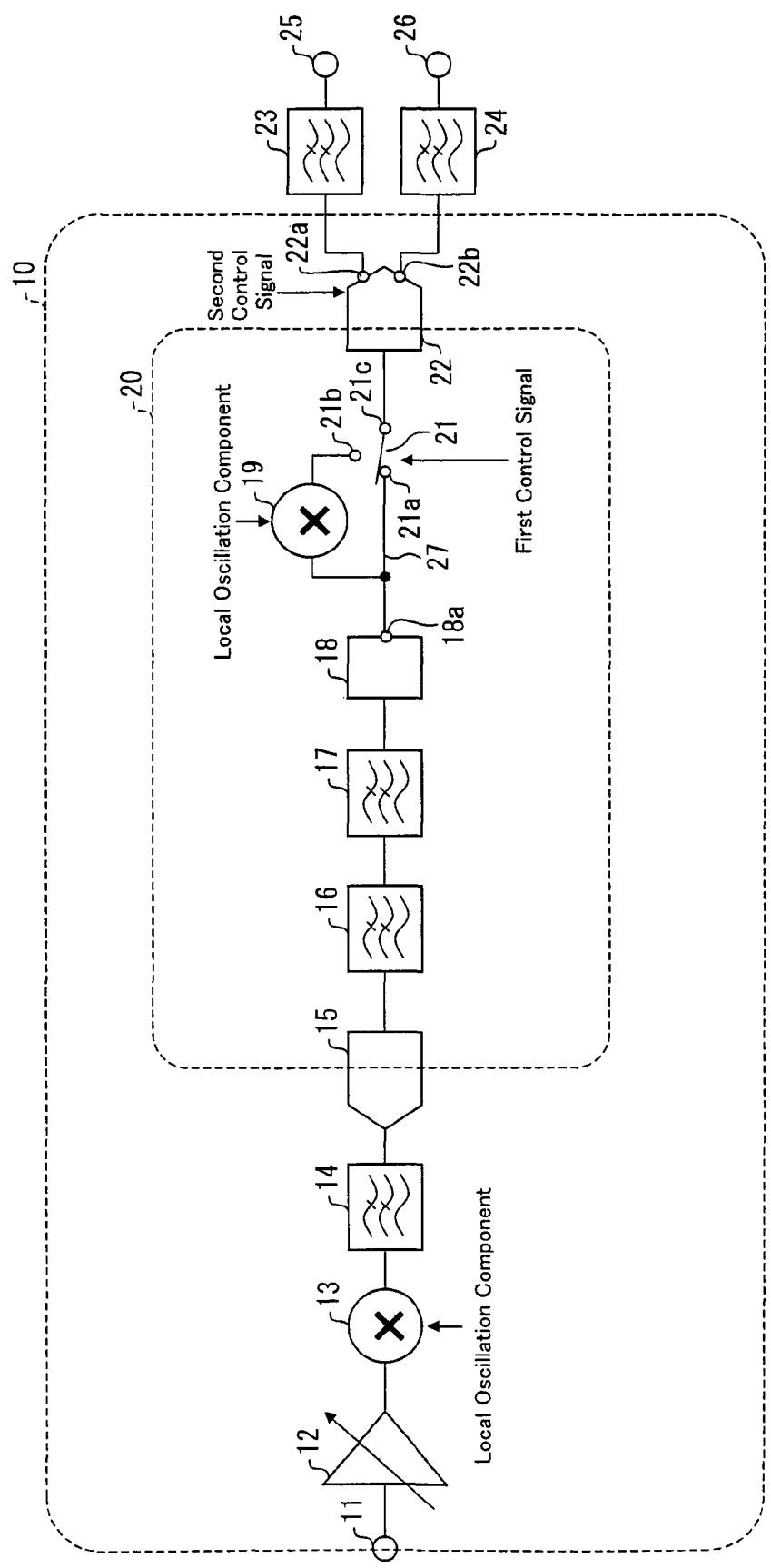
FIG. 1
FIG. 1 is a block diagram of a receiver device in accordance with an embodiment of the present invention.

FIG. 1 is a block diagram of a receiver device in accordance with an embodiment of the present invention.

The receiver device 10 shown in FIG. 1 includes an input terminal 11, a variable gain low noise amplifier 12, a frequency converter (first frequency converter) 13, an analog filter 14, an AD converter 15, a decimation filter 16, a channel selection filter 17, a group delay correction circuit 18, a frequency converter (second frequency converter) 19, a switch (switching circuit) 21, and a DA converter 22.

Specifically, in the receiver device 10 shown in FIG. 1, the input terminal 11, the low noise amplifier 12, the frequency converter 13, the analog filter 14, the AD converter 15, the decimation filter 16, the channel selection filter 17, and the group delay correction circuit 18 are connected in this order. The group delay correction circuit 18 has an output terminal 18a connected to an input end of the frequency converter 19.

The frequency converter 19 has an output end connected to a terminal 21b of the switch 21. A wire (switching circuit) 27 extends from the input end of the frequency converter 19 (specifically, from a point between the output terminal 18a of the group delay correction circuit 18 and the input end of the frequency converter 19) to a terminal 21a of the switch 21. In other words, the wire 27 has an end connected to the input end of the frequency converter 19 and the other end connected to the terminal 21a of the switch 21. Furthermore, the switch 21' has a terminal 21c connected to an input end of the DA converter 22.

In the receiver device 10 shown in FIG. 1, a part of the AD converter 15 (that part which processes digital signals), the decimation filter 16, the channel selection filter 17, the group delay correction circuit 18, the frequency converter 19, the switch 21, and a part of the DA converter 22 (that part which processes digital signals) constitute a digital circuit section (digital circuit) 20 which processes digital signals. Put differently, the decimation filter 16, the channel selection filter 17, and the group delay correction circuit 18 are digital filters.

The DA converter 22 includes a plurality of output terminals 22a and 22b. The output terminal 22a is connected to the analog filter 23 and the output terminal 25 in this order. The output terminal 22b is connected to the analog filter 24 and the output terminal 26 in this order.

The receiver device 10 shown in FIG. 1 operates as in the following to implement various signal processes on incoming signals in a simple and convenient manner.

For example, as an analog signal (reception signal) received by an antenna (not shown) is fed at the input terminal 11 to the receiver device 10 via a filtering circuit (not shown) provided in the stage that precedes the receiver device 10, the receiver device 10 first amplifies the reception signal in the low noise amplifier 12 for output to the frequency converter 13.

The frequency converter 13 converts the frequency of the analog signal fed from the low noise amplifier 12 to the frequency suitable for the various signal processes (first frequency) for output to the analog filter 14.

Figure 5:
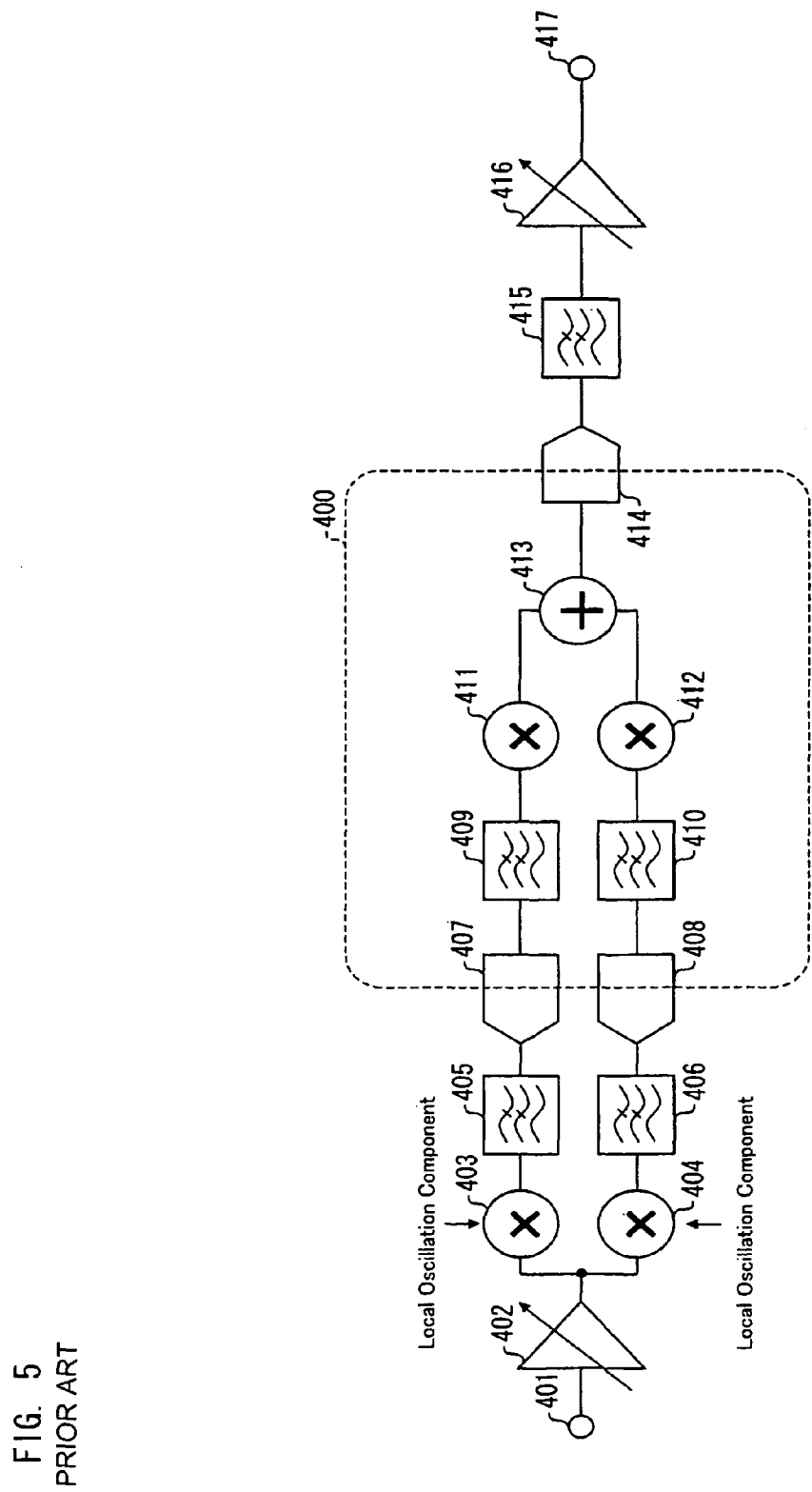
FIG. 5
FIG. 5 is a block diagram of a conventional receiver device.

As with the receiver device shown in FIG. 5, the "frequency suitable for the various signal processes," that is, the first frequency in accordance with the present invention, refers to, for example, either the baseband frequency of the signal (baseband signal) obtained by such direct frequency conversion that the IF frequency can be 0 Hz or the Low-IF frequency of the signal obtained by such Low-IF frequency conversion that the IF frequency can be about 2 MHz to 4 MHz. The term may be defined otherwise. The first frequency may be set to any frequency (desirable frequency) according to frequency characteristics of the demodulator circuit(s) 41 and/or 42 (see FIG. 2).

The frequency converter 13 may be, for example, a known multiplier which carries out frequency conversion of an input signal by mixing the signal with a local oscillation component generated by a local oscillator circuit (not shown).

Between the input terminal 11 and the frequency converter 13 there may be also provided a tracking filter or like (analog) filtering circuit (not shown) to take out desirable frequency components from the analog signal prior to the frequency conversion in the frequency converter 13.

The analog filter 14 removes unnecessary frequency components (interference) from the input signal fed from the frequency converter 13, that is, reduces interference signal, for output to the AD converter 15. Accordingly, the digital circuit section 20 is capable of removing image interference. Hence, the image interference remove ratio can be set to a relatively large value, achieving relatively large image interference removal effect.

The AD converter 15 converts the signal supplied from the analog filter 14 from analog to digital for output to the decimation filter 16. The digital output signal from the AD converter 15 is the first digital signal in accordance with the present invention.

The AD converter 15 may be, for example, a known AD converter. Specifically, the AD converter may be, for example, a $\Delta\Sigma$ AD converter or a pipeline AD converter. The following description will, for the sake of convenience, deal with a case where the AD converter in accordance with the present invention is an oversampling $\Delta\Sigma$ AD converter.

In the stage that precedes the AD converter 15 there may be also provided an amplifier circuit (not shown) containing a variable gain amplifier (not shown) to amplify the input signals from the analog filter 14.

The decimation filter 16 removes interference signal, or "folding noise," which occurs due to the conversion in the AD converter 15 from the digital signal fed from the AD converter 15 for output to the channel selection filter 17.

In other words, the decimation filter 16 lowers the clock rate of the digital input signal. When the AD converter 15 is an oversampling ΔΣ AD converter, the clock rate is set generally to a relatively high frequency for the purpose of oversampling. The provision of the decimation filter 16 enables lowering that frequency. Lowering the frequency in turn contributes to reduction of the overall power consumption in the receiver device. The decimation filter 16 having these properties may be, for example, a known lowpass filter having such filtering properties that the filter can reduce folding noise that occurs due to decimation on the digital signal fed from the AD converter 15 (noise that occurs as a result of folding of the frequency of the digital signal with respect to some frequency). In other words, the decimation filter 16 may be, for example, a known lowpass filter having such filtering properties that the filter can reduce the frequency range, of the input signal, which is folded onto a signal bandwidth in decimation.

The decimation filter 16 may be omitted if the AD converter 15 is not an oversampling AD converter, for example, if it is a pipeline AD converter.

The channel selection filter 17 removes signals in the channels adjacent to the desired channel from the digital signal fed from the decimation filter 16 (adjacent channel rejection) for output to the group delay correction circuit 18.

The channel selection filter 17 is preferably an IIR (Infinite-duration Impulse-Response) filter.

To provide, by using the digital circuit section 20, the channel selection filter 17 with a high adjacent channel rejection capability comparable to that offered by a SAW (Surface Acoustic Wave) filter, the channel selection filter 17 can be built with a smaller order of filter when it is composed of an IIR filter than when it is composed of a FIR (Finite-duration Impulse-Response) filter. The IIR channel selection filter 17 can thus restrain increasing circuit complexity of the digital circuit section 20.

Figure 4:
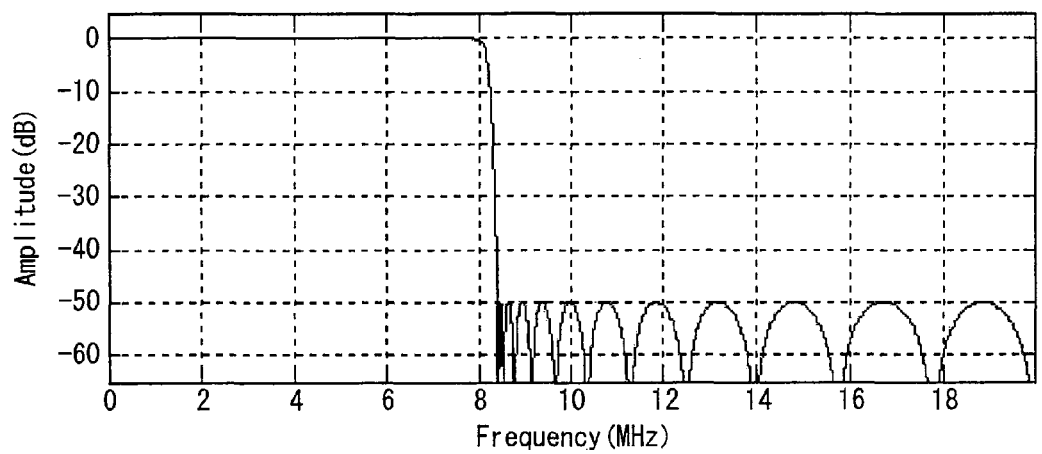
FIG. 4
FIG. 4 is a graph representing an example of filtering properties required of a channel selection filters in accordance with the present invention.

The channel selection filter 17 is required to have a high adjacent channel rejection capability comparable to that of a SAW filter. Also, the filter 17 is required to have such a quickly rising/falling filtering profile that it can damp by about 50 dB the signal components of frequencies below or above the frequencies (a maximum frequency is about 8 MHz) of the digital signals fed from the decimation filter 16 by a predetermined frequency (about 250 kHz) or more as illustrated in FIG. 4. This channel selection filter 17, if composed of an IIR filter, causes deformation in waveform of its digital output signal due to relatively poor group delay characteristics.

Accordingly, the group delay correction circuit 18 is provided to correct the group delay characteristics of the digital output signal from the channel selection filter 17. The provision enables restraining degradation of the group delay characteristics, that is, achieving gradually changing group delay characteristics, when the IIR channel selection filter 17 used has a quickly rising/falling filtering profile. That in turn reduces the deformation in signal waveform.

The group delay correction circuit 18 corrects for a group delay which occurs to the digital signal fed from the channel selection filter 17 for output from the output terminal 18a.

The group delay correction circuit 18 may be, for example, a known digital filter.

The digital output signal from the output terminal 18a of the group delay correction circuit 18 is supplied to the DA converter 22 via either the frequency converter 19 or the wire 27 depending on the switching state of the switch 21.

The switch 21 is composed of a known "Form C" contact switching circuit. The switch 21 changes between a mode where the terminal 21c is connected to the terminal 21a (first mode) and a mode where the terminal 21c is connected to the terminal 21b (second mode) according to a first control signal (detailed later).

When the terminal 21c is connected to the terminal 21a in the switch 21, the input end of the DA converter 22 is connected to the wire 27 (the other end of the wire 27). In that mode, the path between the input end of the DA converter 22 and the output end of the frequency converter 19 is open. The digital output signal from the output terminal 18a of the group delay correction circuit 18 flows sequentially through the wire 27 and the input end of the DA converter 22 and supplied to the DA converter 22. The digital signal is supplied to the DA converter 22 without undergoing frequency conversion in the frequency converter 19.

The digital output signal from the output terminal 18a of the group delay correction circuit 18 is nothing but the digital output signal from the AD converter 15 from which noise is removed by the decimation filter 16, the channel selection filter 17, and the group delay correction circuit 18. Put differently, the frequency of the digital output signal from the output terminal 18a of the group delay correction circuit 18 is suitable for the various signal processes mentioned above. Therefore, in this case, the DA converter 22 is fed with a digital signal (first digital signal) which has undergone frequency conversion in the frequency converter 13 that has a frequency suitable for the various signal processes.

In contrast, when the terminal 21c is connected to the terminal 21b in the switch 21, the input end of the DA converter 22 is connected to the output end of the frequency converter 19. In other words, the frequency converter 19 is connected in series with the group delay correction circuit 18 and the DA converter 22. In that mode, the path between the input end of the DA converter 22 and the wire 27 (the other end of the wire 27) is open. The digital output signal from the output terminal 18a of the group delay correction circuit 18 is supplied to the frequency converter 19. The frequency converter 19 converts the digital signal to such a frequency that the IF frequency is, for example, about 30 MHz to 60 MHz (second frequency) for output to the DA converter 22. The digital signal output from the frequency converter 19 is the second digital signal in accordance with the present invention. The DA converter 22 is fed with a digital signal (second digital signal) which has undergone frequency conversion in the frequency converter 19 that has an IF frequency of about 30 MHz to 60 MHz.

The frequency converter 19 may be, for example, a known multiplier which carries out frequency conversion of an input signal by mixing the signal with a local oscillation component generated by a local oscillator circuit (not shown), as is the case with the frequency converter 13. The second frequency in accordance with the present invention is not limited to the 30 MHz to 60 MHz IF frequency and may be set to any frequency (desirable frequency) according to frequency characteristics of the demodulator circuit(s) 41 and/or 42 (see FIG. 2).

The first control signal supplied to the switch 21 in order to control the switching operation of the switch 21 is not limited to any particular signal format and may be any kind of signal so long as the switch 21 can change between the mode where the terminal 21c is connected to the terminal 21a and the mode where the terminal 21c is connected to the terminal 21b according to a signal state (e.g., signal level) of the first control signal.

An example signal format for the first control signal is a high- and Low-level logic signal. If the logic signal is used, for example, the logic signal level output from a logic circuit (not shown) provided inside the receiver device 10 or connected outside the receiver device 10 is controlled from outside the receiver device 10 deliberately through hardware or software. If the logic signal level exceeds a predetermined threshold, that is, if the logic signal is HIGH, the switch 21 connects the terminal 21c to the terminal 21a. Meanwhile, if the logic signal level is below or equal to the threshold, that is, if the logic signal is LOW, the switch 21 connects the terminal 21c to the terminal 21b.

The DA converter 22 converts the digital signal input from the group delay correction circuit 18 or the frequency converter 19 to an analog signal for output via the output terminal 22a or the output terminal 22b.

The DA converter 22 selectively outputs an analog signal from either the output terminal 22a or the output terminal 22b according to a second control signal.

The second control signal, used to control the DA converter 22 so that either one of the output terminals 22a and 22b is available for use, is not limited to any particular signal format and may be any kind of signal so long as either one of the output terminals 22a and 22b is selectable according to the state (e.g., signal level) of the second control signal. An example signal format for the second control signal is comparison of the signal level of the logic signal to a predetermined threshold, according to a result of which the output terminals 22a and 22b are enabled/disabled. The control of the signal level of the logic signal is the same as with the first control signal; detailed description is not repeated here. The first control signal and the second control signal may be either the same signal or different signals.

The receiver device 10 shown in FIG. 1 is supposed to be a superheterodyne receiver device. The structure containing the wire and the switch as in the receiver device 10 shown in FIG. 1 is applicable to receiver devices other than superheterodyne receiver devices, including direct conversion receiver devices. For the direct conversion receiver device, the configuration of the receiver device 10 shown in FIG. 1 is slightly modified by connecting receiver circuits each consisting of a frequency converter 13, an analog filter 14, an AD converter 15, a decimation filter 16, a channel selection filter 17, a group delay correction circuit 18, a frequency converter 19, a switch 21, and a wire 27, parallel to the existing receiver circuitry between the low noise amplifier 12 and the DA converter 22. The signals obtained by processing in the parallel set of receiver circuitry have practically the same frequency and different phases (I signals and Q signals).

The analog filters 23 and 24 and their subsequent stages in the receiver device 10 shown in FIG. 1 will be described later in detail.

Figure 3:
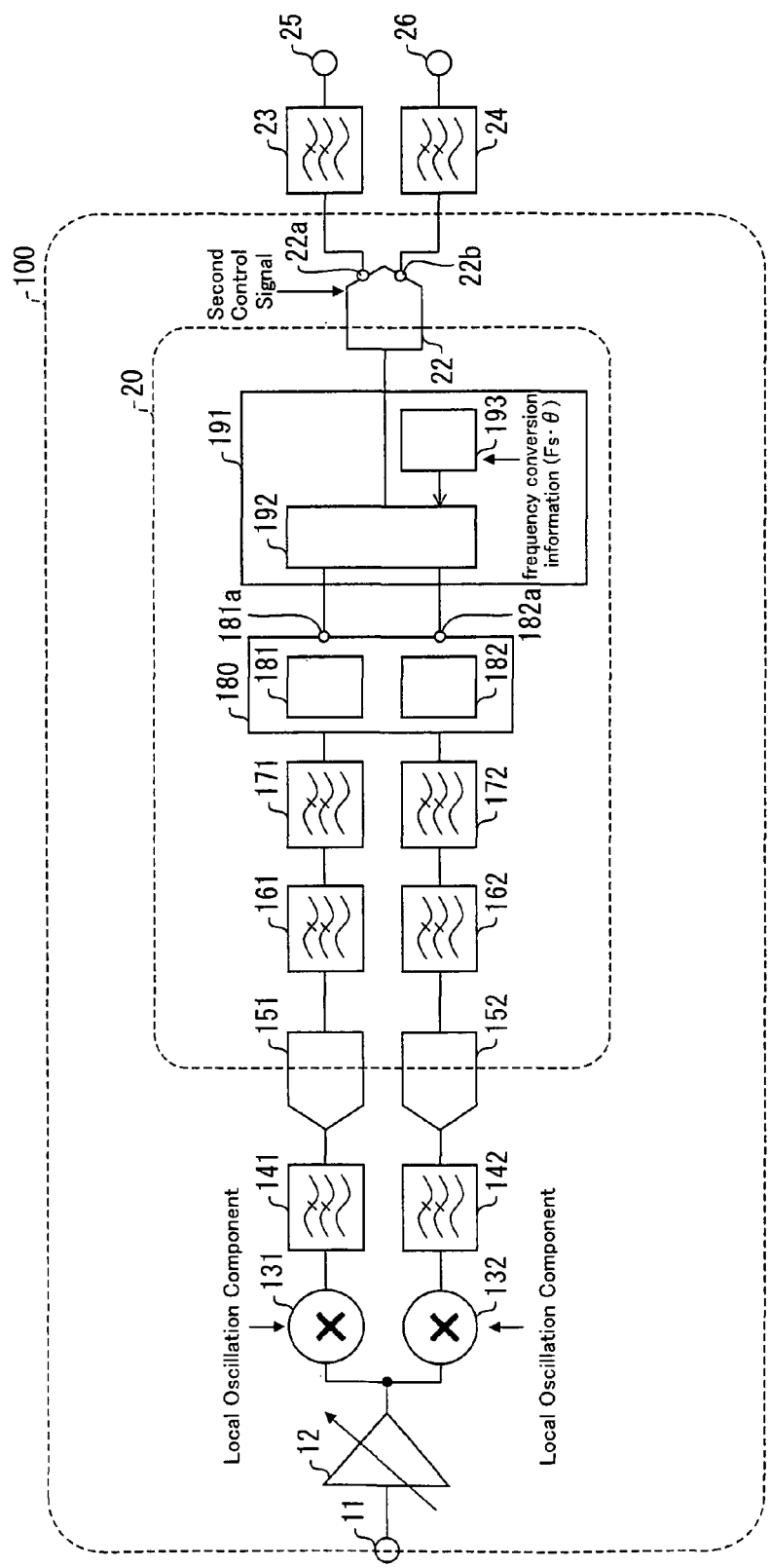
FIG. 3
FIG. 3 is a block diagram of a receiver device in accordance with another embodiment of the present invention.

FIG. 3 is a block diagram of a receiver device in accordance with another embodiment of the present invention.

The receiver device 100 shown in FIG. 3 includes an input terminal 11, a variable gain low noise amplifier 12, frequency converters (first frequency converters) 131 and 132, analog filters 141 and 142, AD converters 151 and 152, decimation filters 161 and 162, channel selection filters 171 and 172, an image removal/group delay correction circuit 180, a CORDIC computation circuit (COordinate Rotation DIgital Computer) 191, and a DA converter 22. The image removal/ group delay correction circuit 180 includes a group delay correction circuit 181 which corresponds to the group delay correction circuit 18 (see FIG. 1) and an image interference removal filter 182 which removes image frequency components from the digital input signal to the image removal/group delay correction circuit 180. The receiver device 100 shown in FIG. 3 is what is called a direct conversion receiver device.

Specifically, in the receiver device 100 shown in FIG. 3, the input terminal 11 and the low noise amplifier 12 are connected in this order. The output end (not shown) of the low noise amplifier 12 is connected to the frequency converters 131 and 132 parallel to each other.

The frequency converter 131 is connected to the analog filter 141, the AD converter 151, the decimation filter 161, and the channel selection filter 171 in this order. The frequency converter 132 is connected to the analog filter 142, the AD converter 152, the decimation filter 162, and the channel selection filter 172 in this order.

Each frequency converter 131 and 132 has a configuration and functions equivalent to those of the frequency converter 13 (see FIG. 1). Each analog filter 141 and 142 has a configuration and functions equivalent to those of the analog filter 14 (see FIG. 1). Each AD converter 151 and 152 has a configuration and functions equivalent to those of the AD converter 15 (see FIG. 1). Each decimation filter 161 and 162 has a configuration and functions equivalent to those of the decimation filter 16 (see FIG. 1). Each channel selection filter 171 and 172 has a configuration and functions equivalent to those of the channel selection filter 17 (see FIG. 1).

The series circuit consisting of the frequency converter 131, the analog filter 141, the AD converter 151, the decimation filter 161, and the channel selection filter 171 has the same configuration and functions as the series circuit consisting of the frequency converter 13, the analog filter 14, AD converter 15, the decimation filter 16, and the channel selection filter 17 in the receiver device 10 shown in FIG. 1. Likewise, the series circuit consisting of the frequency converter 132, the analog filter 142, the AD converter 152, the decimation filter 162, and the channel selection filter 172 has the same configuration and functions as the series circuit consisting of the frequency converter 13, the analog filter 14, the AD converter 15, the decimation filter 16, and the channel selection filter 17 in the receiver device 10 shown in FIG. 1.

Both channel selection filters 171 and 172 are connected to the image removal/group delay correction circuit 180.

The image removal/group delay correction circuit 180 has output terminals 181a and 182a both connected to the CORDIC computation circuit 191. The CORDIC computation circuit 191 is connected to the DA converter 22.

In the receiver device 100 shown in FIG. 3, parts of the AD converters 151 and 152 (those parts which process digital signals), the decimation filters 161 and 162, the channel selection filters 171 and 172, the image removal/group delay correction circuit 180, the CORDIC computation circuit 191, and a part of the DA converter 22 (that part which processes digital signals) constitute a digital circuit section (digital circuit) 20 which processes digital signals. Put differently, the decimation filters 161 and 162, the channel selection filters 171 and 172, and the image removal/group delay correction circuit 180 are digital filters.

The DA converter 22 and its subsequent stages are the same as those in the receiver device 10 shown in FIG. 1; detailed description is not repeated here.

The receiver device 100 shown in FIG. 3 operates as in the following to implement various signal processes on incoming signals in a simple and convenient manner.

For example, as an analog signal (reception signal) received by an antenna (not shown) is fed at the input terminal 11 to the receiver device 100 via a filtering circuit (not shown) provided in the stage that precedes the receiver device 100, the receiver device 100 first amplifies the reception signal in the low noise amplifier 12 for output to the frequency converters 131 and 132.

The frequency converter 131 converts the frequency of the signal fed from the low noise amplifier 12 to a frequency suitable for the various signal processes (first frequency) for output to the analog filter 141. The frequency converter 132 converts the frequency of the signal fed from the low noise amplifier 12 to a frequency suitable for the various signal processes (first frequency) for output to the analog filter 142.

The frequency converters 131 and 132 may be, for example, known multipliers which carry out frequency conversion of an input signal by mixing the signal with a local oscillation component generated by a local oscillator circuit (not shown), as is the case with the frequency converter 13.

The output signals from the frequency converters 131 and 132 have practically the same frequency and different phases. More specifically, each signal is preferably composed of an I signal indicating an in-phase component and a Q signal indicating an orthogonal component which are 90° out of phase.

Between the input terminal 11 and the frequency converter(s) 131 and/or 132 there may be also provided a tracking filter or like (analog) filtering circuit (not shown) as with the frequency converter 13 shown in FIG. 1.

The analog filter 141 removes unnecessary frequency components (interference) from the input signal fed from the frequency converter 131, that is, reduces interference signal, for output to the AD converter 151. The analog filter 142 removes unnecessary frequency components (interference) from the input signal fed from the frequency converter 132, that is, reduces interference signal, for output to the AD converter 152.

The AD converter 151 converts the signal supplied from the analog filter 141 from analog to digital for output to the decimation filter 161. The AD converter 152 converts the signal supplied from the analog filter 142 from analog to digital for output to the decimation filter 162.

The AD converters 151 and 152 may be, for example, known AD converters, either $\Delta\Sigma$ or pipeline AD converters. The following description will, as in the previous case, deal with a case where the AD converters are oversampling $\Delta\Sigma$ AD converters. In the stage that precedes the AD converter(s) 151 and/or 152 there may be also provided an amplifier circuit (not shown) containing a variable gain amplifier (not shown) as is the case with the AD converter 15 shown in FIG. 1.

The decimation filter 161 removes interference signal, or "folding noise," which occurs due to the analog-to-digital conversion from the digital signal fed from the AD converter 151 for output to the channel selection filter 171. The decimation filter 162 removes interference signal, or "folding noise," which occurs due to the analog-to-digital conversion from the digital signal fed from the AD converter 152 for output to the channel selection filter 172.

The channel selection filter 171 removes signals in the channels adjacent to the desired channel from the digital signal fed from the decimation filter 161 (adjacent channel rejection) for output to the image removal/group delay correction circuit 180. The channel selection filter 172 removes signals in the channels adjacent to the desired channel from the digital signal fed from the decimation filter 162 (adjacent channel rejection) for output to the image removal/group delay correction circuit 180.

The channel selection filters 171 and 172 are preferably IIR filters as is the case with the channel selection filter 17 in FIG. 1. To provide, by using the digital circuit section 20, the channel selection filters 171 and 172 with a high adjacent channel rejection capability comparable to that offered by a SAW filter, the channel selection filters 171 and 172 can be built with a smaller order of filter when they are composed of an IIR filter than when they are composed of a FIR filter. The channel selection filters 171 and 172 can thus restrain increasing circuit complexity of the digital circuit section 20.

As the digital signals obtained in the channel selection filters 171 and 172 are fed to the image removal/group delay correction circuit 180 from the channel selection filters 171 and 172, the group delay correction circuit 181 corrects for a group delay that occurs to the digital signals, and the image interference removal filter 182 removes the image frequency component from the digital signal before outputting the digital signal via the output terminals 181a and 182a. If the output signals from the frequency converters 131 and 132 have practically the same frequency and different phases, the output signals from the output terminals 181a and 182a also have practically the same frequency and different phases.

The digital signal outputs at the output terminals 181a and 182a of the image removal/group delay correction circuit 180 are both fed to the CORDIC computation circuit 191.

The CORDIC computation circuit 191 is a publicly known circuit capable of frequency converting the digital signal by carrying out trigonometric function-based computation on the digital input signals. The CORDIC computation circuit 191 includes a CORDIC frequency conversion section (computation/conversion circuit) 192 carrying out that computation and frequency conversion and a frequency conversion control section (computation content control circuit) 193 controlling computation content for the CORDIC frequency conversion section 192 according to internally generated frequency conversion information.

The processes carried out in the CORDIC computation circuit 191 will be now described. The specific circuit structure of the CORDIC computation circuit 191 and the specific computing mechanism of frequency conversion in the CORDIC computation circuit 191 are publicly known technology and can be practiced by any person skilled in the art. The following will give a rough sketch. Detailed description is omitted.

The frequency conversion control section 193 generates frequency conversion information from incoming frequency information Fs and phase information $\theta$ for output to the CORDIC frequency conversion section 192.

The CORDIC frequency conversion section 192 converts the frequency of the digital signal from the frequency suitable for the various signal processes to, for example, an IF frequency (second frequency) of about 30 MHz to 60 MHz, by carrying out trigonometric function-based computation on the digital signals supplied from the image removal/group delay correction circuit 180 through the output terminals 181a and 182a to the CORDIC computation circuit 191 in accordance with the frequency conversion information supplied from the frequency conversion control section 193.

To supply the DA converter 22 with a digital signal of a frequency suitable for the various signal processes (first mode), the frequency conversion information needs to instruct the CORDIC frequency conversion section 192 to carry out no frequency conversion (and no prior computation for the frequency conversion). In this mode, the CORDIC computation circuit 191 outputs the digital signal (first signal) of a frequency suitable for the various signal processes because no frequency conversion is carried out in the CORDIC frequency conversion section 192.

Meanwhile, to supply the DA converter 22 with a digital signal whose IF frequency is, for example, about 30 MHz to 60 MHz (second mode), the frequency conversion information needs to instruct the CORDIC frequency conversion section 192 to carry out the frequency conversion. In this mode, the frequency conversion is carried out in the CORDIC frequency conversion section 192, and the CORDIC computation circuit 191 outputs a digital signal (second digital signal) for which the IF frequency is about 30 MHz to 60 MHz.

According to this arrangement, the CORDIC computation circuit 191 can, in the mode in which to supply the DA converter 22 with a digital signal for which the IF frequency is, for example, about 30 MHz to 60 MHz, convert the frequency of the digital signal for output by carrying out trigonometric function-based computation on the digital signals supplied from the output terminals 181a and 182a of the image removal/group delay correction circuit 180.

The CORDIC frequency conversion section 192 may be said to have a function of switching the digital output signal between the first and second mode frequencies depending on the trigonometric function-based computation content and a function of frequency-converting the digital input signal for output through the second mode computation.

The DA converter 22 converts the signal supplied from the CORDIC computation circuit 191 from digital to analog for output at the output terminal 22a or 22b. The DA converter 22 has a function of selectively outputting the analog signal obtained by the conversion via the output terminal 22a or 22b according to the second control signal.

The analog filters 23 and 24 and their subsequent stages in the receiver device 100 shown in FIG. 3 will be described later in detail.

Figure 2:
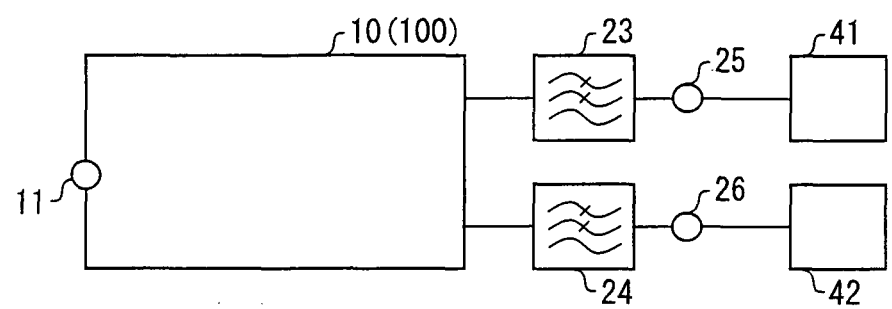
FIG. 2
FIG. 2 is a block diagram of a tuner in accordance with an embodiment of the present invention.

FIG. 2 is a block diagram of the circuit including the receiver device 10 or 100 and its subsequent stages, that is, a tuner in accordance with the present invention.

The receiver device 10 or 100 has its output terminal 25 connected to a demodulator circuit 41. The receiver device 10 or 100 has its output terminal 26 connected to the demodulator circuit 42.

The analog filter 23 removes unnecessary frequency components (interference) from the analog signal supplied from the DA converter 22 via the output terminal 22a (see FIG. 1 or 3) for output via the output terminal 25 to the demodulator circuit 41. The analog filter 24 removes unnecessary frequency components (interference) from the analog signal supplied from the DA converter 22 via the output terminal 22b (see FIG. 1 or 3) for output via the output terminal 26 to the demodulator circuit 42.

The demodulator circuits 41 and 42 may be known demodulator circuits capable of handling the first frequency and/or the second frequency. Assume here, as an example, that the demodulator circuit 41 is a known demodulator device for analog television broadcast for processing signals having the baseband frequency or the Low-IF frequency as the first frequency and also that the demodulator circuit 42 is a known demodulator device for digital television broadcast for processing signals having an IF frequency of, for example, about 30 MHz to 60 MHz as the second frequency.

When the DA converter 22 converts a digital signal having the baseband frequency or the Low-IF frequency to an analog signal for output, the DA converter 22 outputs the analog signal only via the output terminal 22a in accordance with the second control signal. The analog signal output at the output terminal 22a is supplied via the analog filter 23 and the output terminal 25 to the demodulator circuit 41. The filtering properties of the analog filter 23 are set up properly for reception of analog television broadcast. In other words, the analog filter 23 transmits signal components around the baseband frequency or the Low-IF frequency. The demodulator circuit 41 demodulates the input signal to video and audio signals to carry out analog television broadcast on a television receiver (not shown).

Meanwhile, when the DA converter 22 converts a digital signal whose IF frequency is, for example, about 30 MHz to 60 MHz to an analog signal for output, the DA converter 22 outputs the analog signal only via the output terminal 22b in accordance with the second control signal. The analog signal output at the output terminal 22b is supplied via the analog filter 24 and the output terminal 26 to the demodulator circuit 42. The filtering properties of the analog filter 24 are set up properly for reception of digital television broadcast. In other words, the analog filter 24 transmits signal components having a frequency of about 30 MHz to 60 MHz. The demodulator circuit 42 demodulates the input signal to video and audio signals to carry out digital television broadcast on a television receiver (not shown).

The tuner shown in FIG. 2 is suitable for use when a single receiver device needs to receive both analog television broadcast and digital television broadcast. Specifically, in the circuit including the receiver device 10 or 100 and its subsequent stages shown in FIG. 2, the DA converter 22 is provided with two output terminals 22a and 22b, the subsequent stages are connected respectively to the demodulator circuits 41 and 42, and a signal of a different frequency is supplied to each demodulator circuit 41 and 42, so that the tuner is suitable for the above use.

However, this is not intended to be limiting use of the tuner shown in FIG. 2. For example, the tuner may be built around the single receiver device 10 or 100 to receive only either analog television broadcast or digital television broadcast. For a tuner better suited for this use, the output terminal 22a or 22b of the DA converter 22 and the circuit connected to the subsequent stages are omitted from the circuit including the receiver device 10 or 100 and its subsequent stages shown in FIG. 2. In this configuration, a demodulator device can be used in the subsequent stages of the receiver device 10 or 100 as the demodulator device 41 or 42, no matter whether that demodulator device has frequency characteristics suitable for frequencies of about 30 MHz to 60 MHz or for the baseband frequency or the Low-IF frequency.

The receiver device 10 is configured so that it is singly capable of selectively outputting a signal whose IF frequency is about 30 MHz to 60 MHz or either a signal having the baseband frequency or a signal having the Low-IF frequency. The configuration enables a single receiver device 10 to adapt to the demodulator circuits 41 and 42 which have differing frequency characteristics. A television tuner is thus conveniently built which can adapt to broadcast in various countries and regions.

The receiver device 10 is hence advantageous in that the single receiver device enables the demodulator circuits 41 and 42 with differing frequency characteristics to supply respective signals of desired frequencies.

If the digital signal obtained in the frequency converter 19 is not needed, the terminal 21c is connected to the terminal 21a in the switch 21 in the receiver device 10 to skip the frequency conversion in the frequency converter 19. The receiver device consumes less power.

The receiver device 100 is configured so that it is singly capable of selectively outputting a signal whose IF frequency is about 30 MHz to 60 MHz or either a signal having the baseband frequency or a signal having the Low-IF frequency.

The configuration enables a single receiver device 100 to adapt to the demodulator circuits 41 and 42 which have differing frequency characteristics. A television tuner is thus conveniently built which can adapt to broadcast in various countries and regions.

The receiver device 100 is hence advantageous in that the single receiver device enables the demodulator circuits 41 and 42 with differing frequency characteristics to supply respective signals of desired frequencies.

In the configuration including the CORDIC computation circuit 191, a digital signal whose IF frequency is about 30 MHz to 60 MHz and a digital signal having the baseband frequency or the Low-IF frequency can be both output. A frequency conversion circuit including the CORDIC computation circuit 191 does not need to include the frequency converter 19 (see FIG. 1). Furthermore, if the frequency converter 19 is used, the ROM (Read-Only Memory) or PLL (Phase-Locked Loop) (neither shown) needed to generate a signal with a desirable output frequency may be omitted. The digital circuit section 20 and the PLL have a smaller footprint.

The circuit including the receiver device 10 or 100 and their subsequent stages shown in FIG. 2 provides a preferable tuner in accordance with the present invention. Accordingly, a tuner can be provided in which the demodulator circuits 41 and 42 with differing frequency characteristics are supplied with respective signals of frequencies desirable to the demodulator circuits 41 and 42.

The IF frequency is generally about 30 MHz to 60 MHz in the frequency characteristics of the demodulator circuits 41 and 42 as mentioned above. Strictly speaking, the IF frequency varies depending on the demodulator (not shown) used in each country and region. For example, the IF frequency for the demodulator is about 57 MHz in Japan, about 35 MHz in China, and 44 MHz in the United States.

If the second frequency which differs from the first frequency is to be set to a frequency for which the IF frequency is about 30 MHz to 60 MHz and if the receiver device 10 shown in FIG. 1 is to be used, the terminals 21*c* and 21*b* are connected in the switch 21 so that the frequency converter 19 can carry out frequency conversion using the first control signal, and the second frequency is set to a desirable frequency for use in individual country or region. If the receiver device 100 shown in FIG. 3 is to be used, the CORDIC computation circuit 191 may selectively output a signal with the first frequency or a signal with the second frequency set to a desirable frequency to the DA converter 22.

Recent technological revolution have led to successful development of demodulator circuits which were considered difficult to develop due mainly to 1/f noise: namely a demodulator circuit handling such a baseband signal that the center of the channel bandwidth of a received signal is 0 Hz (i.e., adapted to Zero-IF bandwidth) and a demodulator circuit handling a Low-IF frequency signal. The first frequency is set to the Zero-IF frequency or the Low-IF frequency in the receiver device 10 and 100 in the present embodiment. Therefore, if the demodulator circuit is a system handling a Zero-IF frequency signal or a system handling a Low-IF frequency signal, the demodulator circuits 41 and 42 can be supplied with signals of desired frequencies by selectively outputting either of these signals in accordance with the first control signal.

Next, to fabricate a filter with a high adjacent channel rejection capability comparable to that of a SAW filter on a semiconductor substrate, the channel selection filter in accordance with the present invention is preferably a digital circuit and an IIR filter. Generally, the IIR filter requires a smaller order of filter than the FIR filter to provide the same filtering properties. Specifically, to provide the filtering properties shown in FIG. 4, the IIR filter requires almost ⅟₁₀ the order of filter of the FIR filter. The configuration is preferred in reducing footprint and power consumption.

The invention being thus described, it will be obvious that the same way may be varied in many ways. Such variations are not to be regarded as a departure from the spirit and scope of the invention, and all such modifications as would be obvious to one skilled in the art are intended to be included within the scope of the claims.

A receiver device in accordance with the present invention is, to address the problems, characterized in that the device comprises: a first frequency converter for frequency-converting an analog input signal to a first frequency; an analog-to-digital converter for converting an analog signal obtained by the frequency conversion to the first frequency to a first digital signal which is a digital signal having the first frequency to output the first digital signal; a second frequency converter for frequency-converting the incoming first digital signal to a second frequency differing from the first frequency to output a digital signal obtained by the frequency conversion as a second digital signal; a digital-to-analog converter for converting the digital input signal to an analog signal for external output; and a switching circuit for switching between a first mode in which the first digital signal is supplied to the digital-to-analog converter and a second mode in which the second digital signal is supplied to the digital-to-analog converter.

According to the configuration, the switching circuit switches between the first mode in which the first digital signal having the first frequency is supplied to the digital-to-analog converter and the second mode in which the second digital signal having the second frequency is supplied to the digital-to-analog converter. The first frequency differs from the second frequency. Accordingly, in the first mode, the digital-to-analog converter converts the first digital signal to an analog signal for external output. Meanwhile, in the second mode, the converter converts the second digital signal to an analog signal for external output. Put differently, the external output signal of the digital-to-analog converter is an analog signal having the first frequency in the first mode and an analog signal having the second frequency in the second mode.

The receiver device in accordance with the present invention is capable of singly selectively outputting either the analog signal having the first frequency and the analog signal having the second frequency. Therefore, the receiver device in accordance with the present invention is capable of singly supplying demodulator circuits having differing frequency characteristics with respective signals of desired frequencies for the demodulator circuits.

The receiver device in accordance with the present invention is characterized in that: the switching circuit includes: a wire connected at an end thereof to an input end of the second frequency converter; and a switch for connecting an input end of the digital-to-analog converter to either one of the other end of the wire and an output end of the second frequency converter; and the switch connects the input end of the digital-to-analog converter to the other end of the wire in the first mode and connects the input end of the digital-to-analog converter to the output end of the second frequency converter in the second mode.

According to the configuration, the switch in the switching circuit connects the input end of the digital-to-analog converter to the other end of the wire in the first mode and connects the input end of the digital-to-analog converter to the output end of the second frequency converter in the second mode. The switch connects the input end of the digitalto-analog converter selectively to the other end of the wire or the output end of the second frequency converter. In other words, the switch opens the path between the input end of the digital-to-analog converter and the output end of the second frequency converter in the first mode and opens the path between the input end of the digital-to-analog converter and the other end of the wire in the second mode.

The first digital signal, in the first mode, travels sequentially from the input end of the second frequency converter to the end of the wire, the other end of the wire, the input end of the digital-to-analog converter, and finally to the digital-to-analog converter. In the first mode, the first digital signal is supplied to the digital-to-analog converter without going through the second frequency converter, that is, without undergoing no conversion to a second digital signal.

In contrast, in the second mode, the first digital signal travels sequentially from the input end of the second frequency converter to the output end of the second frequency converter, the input end of the digital-to-analog converter, and the digital-to-analog converter. In the second mode, the first digital signal goes through the second frequency converter, that is, undergoes conversion to a second digital signal and supplied to the digital-to-analog converter.

According to the configuration, the frequency conversion and associated processes are not implemented in the second frequency converter in the second mode. Power consumption is lowered.

The receiver device in accordance with the present invention is characterized in that: the second frequency converter is a computation/conversion circuit for carrying out a trigonometric function-based computation on the first digital signal to frequency-convert the first digital signal to the second frequency; the switching circuit is a computation content control circuit for controlling content of the computation in the computation/conversion circuit according to frequency conversion information output to the computation/conversion circuit; and in the second mode, the frequency conversion information instructs to frequency-convert the first digital signal to the second frequency.

According to the configuration, the computation/conversion circuit carries out a trigonometric function-based computation on the first digital signal in the second mode so that it can convert the first digital signal to the second digital signal. Put differently, the computation content control circuit serves as the switching circuit switching between the first mode and the second mode by controlling the computation content according to the frequency conversion information. The computation/conversion circuit serves as the second frequency converter converting the first digital signal to the second digital signal by carrying out the computation.

The receiver device in accordance with the present invention is characterized in that at least either one of the first and second frequencies is set to a desirable frequency in accordance with frequency characteristics of a demodulator circuit demodulating the analog output signal from the digital-to-analog converter.

According to the configuration, at least either one of the first and second frequencies is set to a desired frequency for the demodulator circuit in accordance with the frequency characteristics of the demodulator circuit demodulating the analog output signal from the digital-to-analog converter. Therefore, the receiver device is reliably capable of singly supplying demodulator circuits having differing frequency characteristics with respective signals of desired frequencies for the demodulator circuits.

The receiver device in accordance with the present invention is characterized in that each signal having the first frequency is either a signal obtained by direct frequency conversion or a signal, which has a center frequency of 2 to 4 MHz, obtained by Low-IF frequency conversion.

According to the configuration, each signal having the first frequency is a signal (signal A), which has a center frequency of 0 Hz, obtained by direct frequency conversion or a signal (signal B), which has a center frequency of 2 MHz to 4 MHz, obtained by Low-IF frequency conversion. The first digital signal obtained by analog-to-digital conversion of one of signals A and B in the analog-to-digital converter is suitable for various signal processes. In other words, the circuit carrying out the various signal processes on the first digital signal obtained as a result of direct or Low-IF frequency conversion can be built from a Low-frequency digital circuit. That makes the operation of the receiver device stable and improves the selectivity of the circuit. A high performance circuit block can be built.

The receiver device in accordance with the present invention is characterized in that the device includes a plurality of first frequency converters, wherein the first frequency converters output signals having practically the same frequency and different phases.

According to the configuration, image interference can be removed relatively easily by processing signals using the plurality of signals having practically the same frequency and different phases.

The receiver device in accordance with the present invention is characterized in that the device further includes an analog filter, disposed between the first frequency converter and the analog-to-digital converter, for removing noise from the analog signal obtained by the frequency conversion to the first frequency.

According to the configuration, image interference can be removed during the course of processing the first digital signal, that is, by a digital circuit. That allows an image interference remove ratio to be set to a relatively large value, achieving relatively large image interference removal effect.

The receiver device in accordance with the present invention is characterized in that the device further includes an image interference removal filter for removing an image frequency component from a digital input signal.

According to the configuration, the image interference removal filter removes an image frequency component, achieving large image interference removal effect.

Generally, signals in channels adjacent to a desired channel need to be removed in the receiver device. To achieve larger effect in the removing, a SAW filter is often used which exhibits a quickly rising/falling filtering profile (decay characteristics of input signals in relation to the frequencies of the signals). The SAW filter is typically provided outside the receiver device.

If a filtering circuit with a large capability in the removal of signals in the adjacent channels comparable to that of a SAW filter can be provided in an integrated circuit containing a receiver device, the number of components provided outside the receiver device is reduced, which could lead to low cost.

Constructing the filtering circuit as an analog filter is not preferred because it can cause an increased order of filter. Meanwhile, there is technology to construct the filtering circuit as a digital filter: for example, the technology disclosed in U.S. Pat. No. 7,265,792 (published Jan. 5, 2006; hereinafter "patent literature 2"). The technology disclosed in patent literature 2 eliminates SAW filters by using an FIR filter in a digital circuit.

However, constructing a filtering circuit having image interference removal effect that is comparable to that of a SAW filter from a FIR filter as in technology disclosed in patent literature 2 leads to a high order of filter in the FIR filter. Footprint and power consumption undesirably increase.

Accordingly, the receiver device in accordance with the present invention is characterized in that the device further includes a digital filter, disposed between the analog-to-digital converter and the second frequency converter, for removing noise from the first digital signal, wherein: the digital filter includes: a channel selection filter for removing a signal in a channel adjacent to a desired channel from the first digital signal; and a group delay correction circuit for correcting for degradation of group delay characteristics of a signal from the channel selection filter; and the channel selection filter is an IIR filter.

According to the configuration, the channel selection filter is built from an IIR filter in providing, between the analog-to-digital converter and the second frequency converter, a channel selection filter having a large effect of removing signals in channels adjacent to a desired channel that is comparable to that of a SAW filter, that is, the channel selection filter is built as a digital circuit. The channel selection filter hence has a smaller order of filter than when it is built from an FIR filter. As a result, the IIR channel selection filter restrains increase in the circuit complexity of the digital circuit.

The channel selection filter is required to exhibit a high adjacent channel rejection capability comparable to that of a SAW filter and a quickly rising/falling filtering profile. Upon going through the channel selection filter built from an IIR filter, the digital signal shows a deformed waveform due to degradation group delay characteristics.

Accordingly, the group delay correction circuit is provided to correct for degradation of group delay characteristics of the output signal from the channel selection filter. The provision enables restraining degradation of the group delay characteristics, that is, achieving gradually changing group delay characteristics, by correcting the group delay characteristics of the digital output signal from the channel selection filter when an IIR channel selection filter having a quickly rising/falling filtering profile is used. That in turn reduces the deformation in signal waveform.

The receiver device in accordance with the present invention is characterized in that the analog-to-digital converter is of a $\Delta\Sigma$ type.

According to the configuration, the analog filter has a reduced order of filter in an analog circuit. The sampling frequency is generally set to a high value in a $\Delta\Sigma$ analog-to-digital converter provided in a receiver device so that the noise on the analog input signal to the receiver device can have sufficiently high (or sufficiently low) frequencies when compared to the signals in adjacent channels. Accordingly, the analog filter removing the noise can have a reduced order of filter.

The receiver device in accordance with the present invention is characterized in that the device further includes a decimation filter for removing folding noise from the first digital signal.

According to the configuration, the analog-to-digital converter is capable of removing the noise on the first digital signal that occurs in the conversion to the first digital signal, that is, folding noise.

The receiver device in accordance with the present invention is characterized in that the digital-to-analog converter has output terminals and externally outputs the analog signal from one of the output terminals.

According to the configuration, by externally outputting the signal from the output terminals, the receiver device is singly capable of supplying the demodulator circuits with differing frequency characteristics provided subsequent to the receiver device with respective signals of desired frequencies for the demodulator circuits.

The receiver device in accordance with the present invention is characterized in that the device further includes: an analog filter, disposed subsequent to an output terminal used in the first mode, for passing a signal component having the first frequency; and an analog filter, disposed subsequent to an output terminal used in the second mode, for passing a signal component having the second frequency.

The configuration is more preferred. According to the configuration, the receiver device is capable of singly supplying the demodulator circuits with differing frequency characteristics provided subsequent to the receiver device with respective signals of desired frequencies for the demodulator circuits because an analog filter reliably remove a signal component having the first frequency from the output terminal used in the first mode and another analog filter reliably remove a signal component having the second frequency from the output terminal used in the second mode.

A tuner in accordance with the present invention is characterized in that the tuner includes: a receiver device in accordance with the present invention; and a demodulator circuit for demodulating an analog output signal from the digital-to-analog converter in the receiver device. A television receiver in accordance with the present invention is characterized in that the receiver includes a tuner in accordance with the present invention.

According to the configuration, the resultant tuner and television receiver are such that the receiver device is singly capable of supplying the demodulator circuits with differing frequency characteristics with respective signals of desired frequencies for the demodulator circuits.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The present invention is applicable to receiver devices, tuners, and television receivers composed of a combination of analog circuits and digital circuits provided on a semiconductor substrate.

REFERENCE SIGNS LIST 10, 100 Receiver Device
13, 131, 132 Frequency Converter (First Frequency Converter)
14, 23, 24, 141, 142 Analog Filter
15, 151, 152 AD Converter (Analog-to-digital Converter)
16, 161, 162 Decimation Filter
17, 171, 172 Channel Selection Filter
180 Image Removal/Group Delay Correction Circuit
18, 181 Group Delay Correction Circuit
182 Image Interference Removal Filter
19 Frequency Converter (Second Frequency Converter)
20 Digital Circuit Section (Digital Circuit)
21 Switch (Switching Circuit)
21a to 21c Terminal
22 DA Converter (Digital-to-analog Converter)
22a, 22b Output Terminal
27 Wire (Switching Circuit)
41, 42 Demodulator Circuit
191 CORDIC Computation Circuit
192 CORDIC Frequency Conversion Section (Computation/conversion Circuit)
193 Frequency Conversion Control Section (Computation Content Control Circuit)

The invention claimed is:

1. A receiver device, comprising:
  a first frequency converter for frequency-converting an analog input signal to a first frequency;
  an analog-to-digital converter for converting an analog signal obtained by the frequency conversion to the first frequency to a first digital signal which is a digital signal having the first frequency;

a second frequency converter for frequency-converting the first digital signal to a second frequency differing from the first frequency to output a digital signal as a second digital signal;

a digital-to-analog converter for converting one of the first and second digital signals to an analog signal for external output; and a switching circuit for switching between a first mode in which the first digital signal is supplied to the digital-to-analog converter and a second mode in which the second digital signal is supplied to the digital-to-analog converter, the switching circuit including, a wire connected at an end thereof to an input of the second frequency converter, and a switch for connecting an input of the digital-to-analog converter to one of another end of the wire and an output of the second frequency converter, the switch being configured to connect the input of the digital-to-analog converter to the another end of the wire in the first mode and connect the input of the digital-to-analog converter to the output of the second frequency converter in the second mode, wherein the second frequency converter is a computation/conversion circuit for carrying out a trigonometric function-based computation on the first digital signal to frequency-convert the first digital signal to the second frequency, and the switching circuit is a computation content control circuit for controlling content of the computation in the computation/conversion circuit according to frequency conversion information output to the computation/conversion circuit.

2. The receiver device as set forth in claim 1, wherein at least one of the first and second frequencies is set to a frequency in accordance with frequency characteristics of a demodulator circuit configured to demodulate the analog output signal from the digital-to-analog converter.

3. The receiver device as set forth in claim 1, wherein each signal having the first frequency is one of a signal obtained by direct frequency conversion and a signal, which has a center frequency of 2 to 4 MHz, obtained by Low-IF (Low-Intermediate Frequency) frequency conversion.

4. The receiver device as set forth in claim 1, comprising a plurality of first frequency converters, wherein the first frequency converters are configured to output signals having substantially the same frequency and different phases.

5. The receiver device as set forth in claim 1, further comprising an analog filter, disposed between the first frequency converter and the analog-to-digital converter, for removing noise from the analog signal obtained by the frequency conversion to the first frequency.

6. The receiver device as set forth in claim 4, wherein further comprising an image interference removal filter for removing an image frequency component from a digital input signal.

7. The receiver device as set forth in claim 1, further comprising:

a digital filter, disposed between the analog-to-digital converter and the second frequency converter, for removing noise from the first digital signal, wherein the digital filter includes, a channel selection filter for removing a signal in a channel adjacent to a desired channel from the first digital signal; and a group delay correction circuit for correcting for degradation of group delay characteristics of a signal from the channel selection filter, and the channel selection filter is an IIR filter.

8. The receiver device as set forth in claim 1, wherein the analog-to-digital converter is of a $\Delta\Sigma$ type.

9. The receiver device as set forth in claim 8, further comprising a decimation filter for removing folding noise from the first digital signal.

10. The receiver device as set forth in claim 1, wherein the digital-to-analog converter has output terminals and is configured to externally output the analog signal from one of the output terminals.

11. The receiver device as set forth in claim 10, further comprising:

an first analog filter, disposed subsequent to an output terminal used in the first mode, for passing a signal component having the first frequency; and an second analog filter, disposed subsequent to an output terminal used in the second mode, for passing a signal component having the second frequency.

12. A tuner, comprising:

a receiver device including, a first frequency converter for frequency-converting an analog input signal to a first frequency, an analog-to-digital converter for converting an analog signal obtained by the frequency conversion to the first frequency to a first digital signal which is a digital signal having the first frequency, a second frequency converter for frequency-converting the first digital signal to a second frequency differing from the first frequency to output a digital signal as a second digital signal, a digital-to-analog converter for converting one of the first and second digital signals to an analog signal for external output, and a switching circuit for switching between a first mode in which the first digital signal is supplied to the digital-to-analog converter and a second mode in which the second digital signal is supplied to the digital-to-analog converter; and a demodulator circuit for demodulating an analog output signal from the digital-to-analog converter in the receiver device, the switching circuit including, a wire connected at an end thereof to an input of the second frequency converter, and a switch for connecting an input of the digital-to-analog converter to one of another end of the wire and an output of the second frequency converter, the switch being configured to connect the input of the digital-to-analog converter to the another end of the wire in the first mode and connect the input of the digital-to-analog converter to the output of the second frequency converter in the second mode, wherein the second frequency converter is a computation/conversion circuit for carrying out a trigonometric function-based computation on the first digital signal to frequency-convert the first digital signal to the second frequency, and the switching circuit is a computation content control circuit for controlling content of the computation in the computation/conversion circuit according to frequency conversion information output to the computation/conversion circuit.

* * * * *